United States Patent [19]
Nishio

[11] Patent Number: 5,170,273
[45] Date of Patent: Dec. 8, 1992

[54] WAVELENGTH-DIVISION SWITCHING SYSTEM FOR OPTICAL FREQUENCY-SHIFT KEYING SIGNALS

[75] Inventor: Makoto Nishio, Tokyo, Japan

[73] Assignee: NEC Corporation, Tokyo, Japan

[21] Appl. No.: 471,346

[22] Filed: Jan. 29, 1990

[30] Foreign Application Priority Data

Jan. 27, 1989 [JP] Japan .................................. 1-19147

[51] Int. Cl.$^5$ ............................................. H04J 14/02
[52] U.S. Cl. ....................................... 359/128; 359/181
[58] Field of Search ................... 455/600; 370/1, 3, 4; 350/96.13, 96.14; 359/124, 127, 128, 181, 114; 385/16

[56] References Cited

U.S. PATENT DOCUMENTS

5,027,435  6/1991  Chraplyvy et al. ................. 359/173

FOREIGN PATENT DOCUMENTS

0172841  9/1985  Japan ....................................... 370/4

OTHER PUBLICATIONS

Nishio et al, "Eight-Channel Wavelength-Division Switching Experiment using Wide-Tuning-Range DFB LD Filters", IEE ECOC 88, Conference Publication No. 292—Part 2.

Magari et al, "Optical Narrow-Band Filters Using Optical Amplification with Distributed Feedback," IEEE Journal of Quantum Electronics, vol. 34, No. 11, Nov. 1988.

Kobayashi et al, "Injection Locking in AlGaAs Semiconductor Laser", IEEE Journal of Quantum Electronics, vol. QE-17, No. 5, May, 1981.

I. Kaminow et al, "FDMA-FSK Star Network with a ... Filter Demultiplexer", Journal of Lightwave Technology, vol. 6, No. 9, Sep. 1988, pp. 1406-1414.

M. Fujiwara et al, "Application of Coherent Optical Transmission Technologies to Photonic Switching Networks", The Transactions of the IEICE, vol. E72, No. 1, Jan. 1989, pp. 55-61.

*Primary Examiner*—Edward L. Coles, Sr.
*Assistant Examiner*—Kinfe-Michael Negash
*Attorney, Agent, or Firm*—Sughrue, Mion, Zinn, Macpeak & Seas

[57] ABSTRACT

A cross-talk reducing optical switching system receives electrical digital signals at its input terminals. The electrical signals are converted to frequency-shift keying (FSK) optical signals, which differ in center wavelength $\lambda_i$ (i=1 to N). The FSK signals are wavelength-division multiplexed (WDM) into a WDM signal which is next split into wavelength-corresponding optical WDM signals W. A wavelength extracting circuit then extracts optical FSK signals pertaining to center wavelength $\lambda_i$, which are to be switched to center wavelengths $\lambda_j$ (j=1 to N), from the WDM signals W. The extracted FSK signals are next switched to optical FSK signals corresponding to center wavelengths $\lambda_j$. Finally, the switched FSK signals are wavelength-multiplexed and converted back into electrical digital signals, thus establishing predetermined communication channels between a plurality of input terminals and a plurality of output terminals.

7 Claims, 8 Drawing Sheets

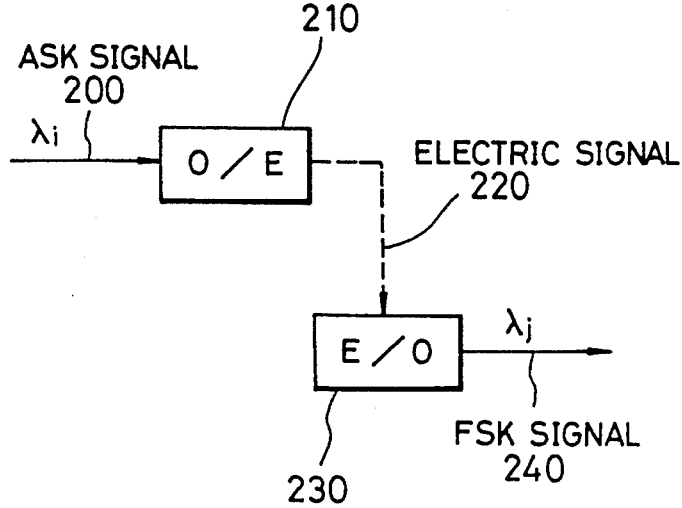

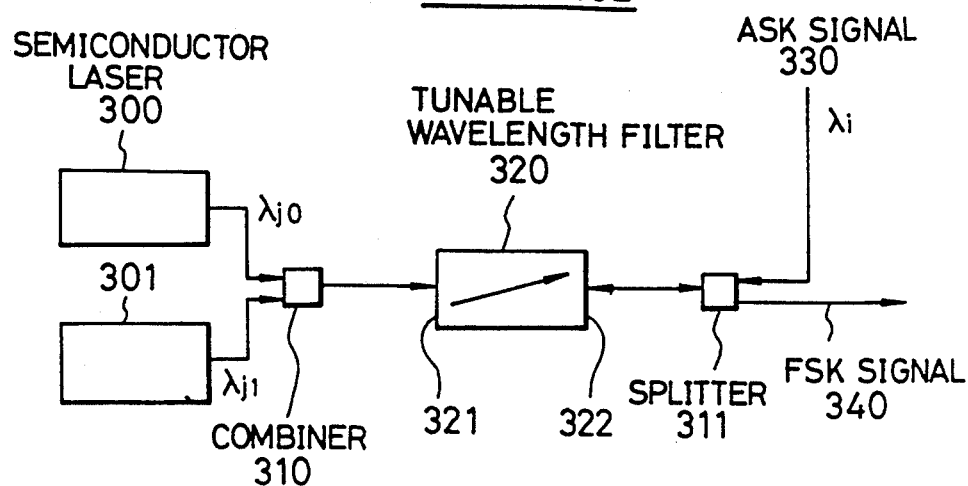
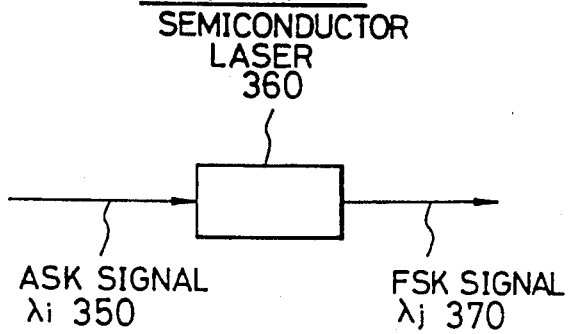

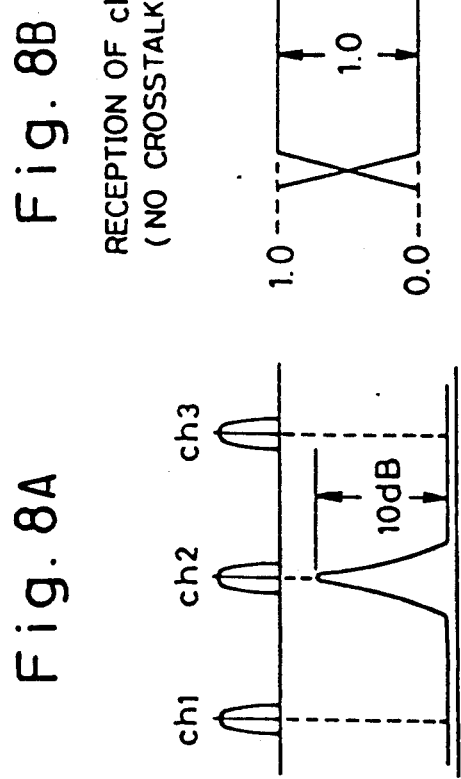
Fig. 8D CROSSTALK OF ch1, ch3
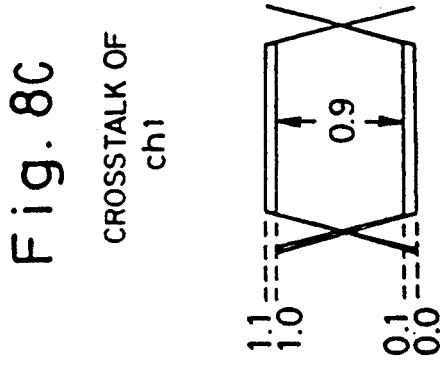
Fig. 8C CROSSTALK OF ch1
Fig. 8B RECEPTION OF ch2 (NO CROSSTALK)
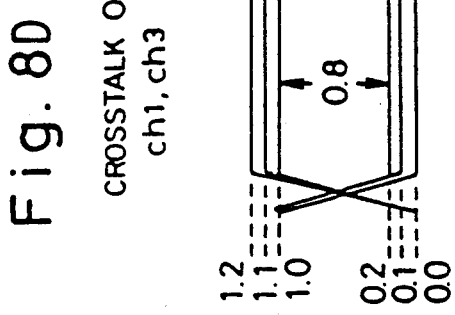
Fig. 8A

WAVELENGTH-DIVISION SWITCHING SYSTEM FOR OPTICAL FREQUENCY-SHIFT KEYING SIGNALS

BACKGROUND OF THE INVENTION

The present invention relates generally to switching systems for optical signals, and more specifically to a wavelength-division (WD) switching system for optical frequency-shift keying (FSK) signals.

Optical fiber transmission systems, which use optical fibers for transmission lines, are expected to find increasingly extensive use in the future because of their capability of transmitting large quantities of information by virtue of the wide band feature of optical fibers and the immunity of optical fibers from induction noise. Switching systems for use with such optical fiber transmission systems should desirably be optical switching systems capable of switching optical signals in the optical region. In the optical WD switching system, which is one of those optical switching systems, speech or transmission channels are established between the wavelengths of wavelength-multiplexed input and output optical signals, which are switched by converting their wavelengths.

As an example of the optical WD switching system, there is known the configuration described by Nishio et al., "Eight-Channel Wavelength-Division Switching Experiment Using Wide Tuning-Range DFB LD Filters", IEE, ECOC 88, Conference Publication Number 292-Part 2.

In the optical WD switching system described in that literature, however, some optical signals of wavelengths other than the wavelength to be selected by a tunable wavelength filter or a fixed wavelength filter are also transmitted as crosstalk when the tunable or fixed wavelength filter selects optical signals of a certain wavelength from wavelength-multiplexed optical signals. Since the optical signals of different wavelengths are intensity-modulated in conventional optical WD switching systems, the crosstalk adversely affect the optical signals of the wavelength to be selected and invite their deterioration, as described later.

SUMMARY OF THE INVENTION

An object of the present invention is to provide an optical WD switching system capable of reducing the signal deterioration due to crosstalk by optical signals of wavelengths other than that to be selected when an optical signal of a certain wavelength is being selected by a tunable or a fixed wavelength filter.

An optical switching system according to one aspect of the invention comprises an input terminal for receiving an optical wavelength-division multiplexed (WDM) signal in which optical signals differing in center wavelength $\lambda_i$ (i=1 to N) are wavelength-division multiplexed, the optical signals being optical frequency-shift keying (FSK) signals $F_i$.

Wavelength extracting circuits extract optical FSK signals $F_i$ (i=1 to N) pertaining to wavelengths $\lambda_i$, which are to be switched to wavelengths $\lambda_j$ (j=1 to N) from the optical wavelength-division multiplexed WDM signal to generate optical amplitude-shift keying (ASK) signals $A_i$ pertaining to the wavelengths $\lambda_i$. Wavelength switches switch the optical ASK signals $A_i$ to optical FSK signals $F'_j$ corresponding to the wavelengths $\lambda_j$. A wavelength multiplexer wavelength-multiplexes the optical FSK signals $F'_j$ into an optical switched WDM signal.

BRIEF DESCRIPTION OF THE DRAWINGS

The above and other objects, features and advantages of the present invention will become apparent from the following detailed description when taken with the accompanying drawings, in which:

FIGS. 4, 5A and 5B are block diagrams illustrating examples of FSK wavelength converters for use in the embodiment of FIG. 3;

FIGS. 8 and 9 are diagrams for explaining the benefits of the present invention.

In the figures, the same reference numerals are assigned to respectively the same constituent elements.

DETAILED DESCRIPTION OF THE PREFERRED EMBODIMENTS

Figure 1:
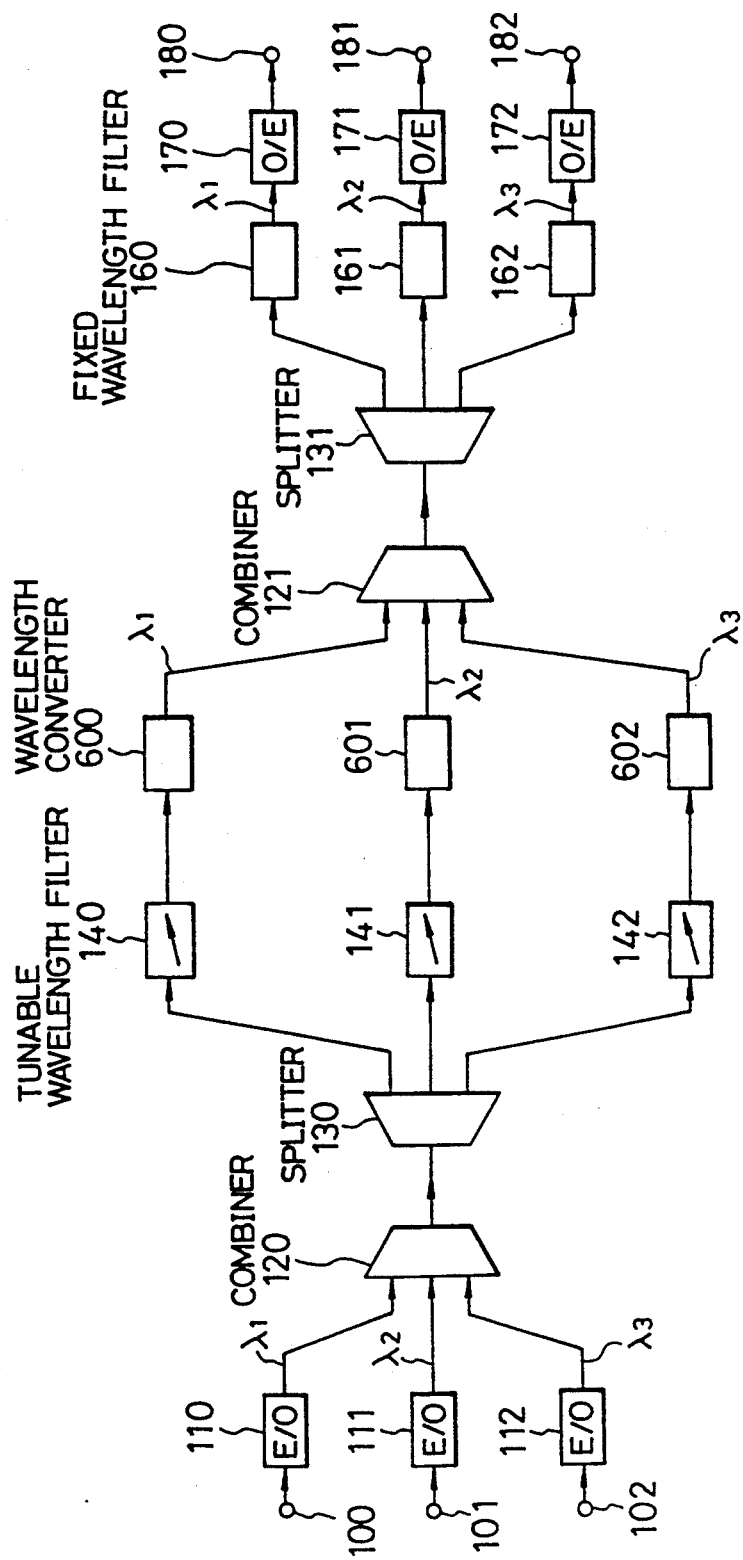
FIG. 1 is a block diagram illustrating an optical WD switching system by the prior art.

With a view to facilitating the understanding of the present invention, a WD switching system according to the prior art will be described first. In FIG. 1, an optical switching system for multiplexing three wavelengths is illustrated in the form of a block diagram. Electro-optical (E/O) converters 110 to 112 convert electric signals into optical signals by intensity-modulating lights of wavelengths $\lambda_1$, $\lambda_2$ and $\lambda_3$ according to the "0" level or "1" level of the electric signals fed to input terminals 100 to 102. A combiner 120 multiplexes the optical signals of wavelengths $\lambda_1$ to $\lambda_3$ to generate an optical WDM signal. A splitter 130 splits the optical WDM signal of wavelengths $\lambda_1$ to $\lambda_3$, and the resultant split signals are brought to incidence on tunable wavelength filters 140 to 142. The filters 140 to 142 select one each of any wavelength, out of the optical WDM signals of wavelengths $\lambda_1$ to $\lambda_3$, and send them to wavelength converters 600 to 602. The wavelength converters 600 to 602, after converting the wavelengths of the output optical signals of the tunable wavelength filters 140 to 142 into $\lambda_1$ to $\lambda_3$, respectively, send the optical signals of wavelengths $\lambda_1$ to $\lambda_3$ to a combiner 121.

The multiplexed optical signal of wavelengths $\lambda_1$ to $\lambda_3$ from the combiner 121 are split by a splitter 131 and supplied to fixed wavelength filters 160 to 162. The filters 160 to 162 select a fixed one among the wavelengths $\lambda_1$ to $\lambda_3$ from the multiplexed optical signals of wavelengths $\lambda_1$ to $\lambda_3$, and send the selected signals to opto-electric (O/E) converters 170 to 172. The O/E converters 170 to 172, after converting the optical signals of wavelengths $\lambda_1$ to $\lambda_3$ from the fixed wavelength filters 160 to 162 into electric signals, supply these electric signals to output terminals 180 to 182, respectively. Thus, it is made possible to convert optical signals of any wavelengths, inputted to the wavelength converters 600 to 602, into ones of any other wavelengths by varying the wavelengths selected by the tunable wavelength filters 140 to 142, and thereby to establish channels between the input terminals 100 to 102 and the output terminals 180 to 182. Incidentally, distributed feedback laser diodes can be used as the tunable wavelength filters for this system.

Figure 2:
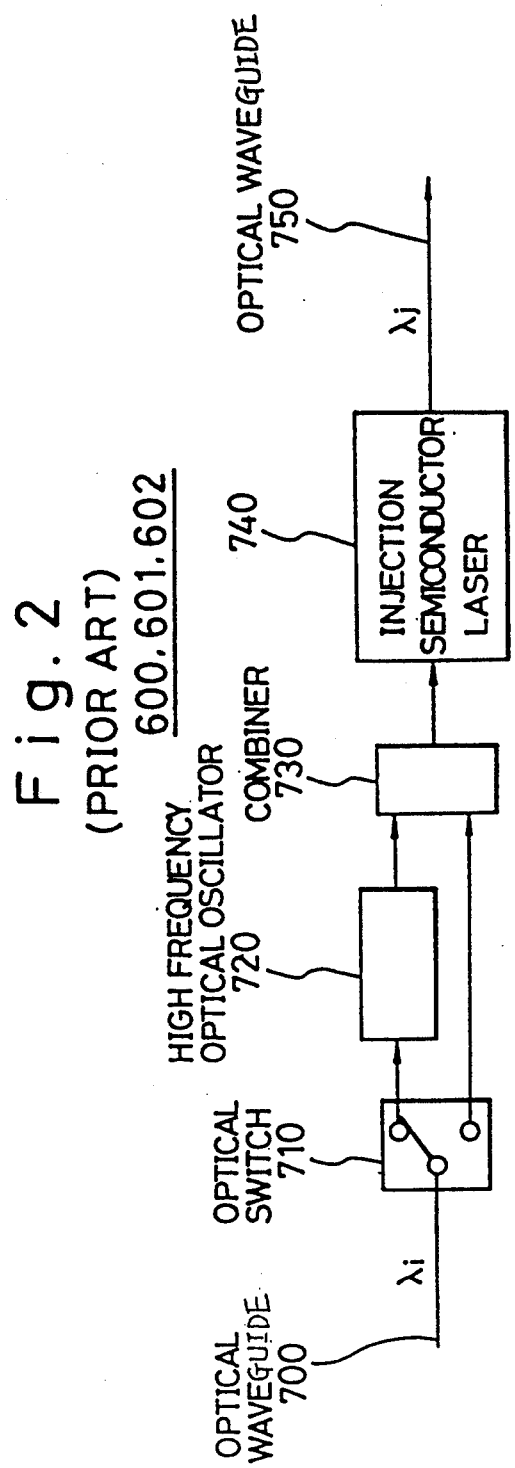
FIG. 2 is a block diagram illustrating a specific example of wavelength converter for use in the system of FIG. 1.

FIG. 2 is a block diagram illustrating a specific example of the wavelength converters 600 to 602 in FIG. 1. In FIG. 2, each of the wavelength converters 600 to 602 comprises a 1×2 optical switch 710 whose input terminal is connected to an optical waveguide 700, a high frequency optical oscillator 720 to which the first output of the optical switch 710 is inputted, a combiner 730 to which the output of the high frequency optical oscillator 720 and a second output of the optical switch 710 are inputted, and an injection semiconductor laser 740 whose input is the output of the combiner 730 and to whose output is connected an optical waveguide 750.

An optical signal of a wavelength $\lambda_i$ transmitted from the optical waveguide 700, if $\lambda_i$ is to be converted to a shorter wavelength than the inherent wavelength $\lambda_j$ of the injection semiconductor laser, is so switched by the optical switch 710 as not to pass the high frequency optical oscillator 720 but to directly enter the combiner 730. Meanwhile, if the wavelength $\lambda_i$ is to be converted into a longer wavelength than $\lambda_j$, the optical signal is entered by the optical switch 710 into the high frequency optical oscillator 720, converted into an optical signal having a wavelength shorter than $\lambda_j$ and inputted to the combiner 730. This operation of the optical switch 710 is accomplished by a speech path control section (not shown), in which the wavelengths $\lambda_i$ and $\lambda_j$ are stored as data. In both cases, the output of the combiner 730 is an optical signal shorter in wavelength than $\lambda_i$, and the injection of this signal into the injection semiconductor laser 740 causes it to oscillate at $\lambda_j$ to send out to the optical waveguide 750 an optical signal whose wavelength has been converted from $\lambda_i$ to $\lambda_j$. The high frequency optical oscillator 720 can be realized by using nonlinear optical crystals, such as LiNbO$_3$ crystals, and the injection semiconductor laser 740 may consist of a semiconductor laser of, for instance, a planar stripe type double hetero structure. For details of this injection semiconductor laser, reference may be made to Soichi Kobayashi et al., "Injection Locking in AlGaAs Semiconductor Laser" published in IEEE Journal of Quantum Electronics, Vol. QE-17, No. 5, May, 1981.

In such a switching system by the prior art, however, there is the aforementioned problem that crosstalk may deteriorate optical signals on other channels.

Figure 3:
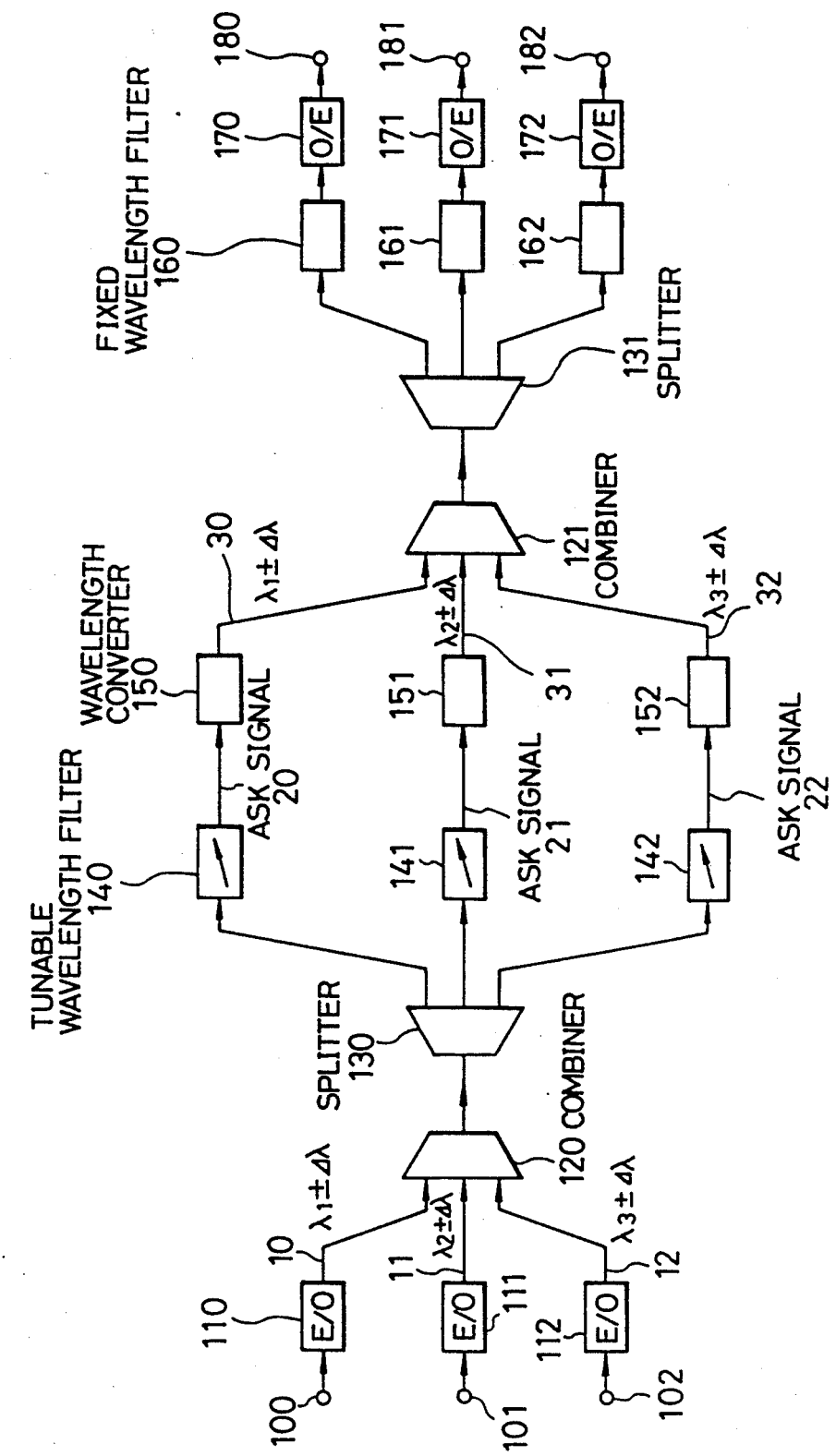
FIG. 3 is a block diagram illustrating a preferred embodiment of the present invention.

FIG. 3 is a block diagram illustrating a preferred embodiment of the present invention, in which the number of wavelengths to be multiplexed is three as in the system of FIG. 1. In FIG. 3, an E/O converter 110 converts a two-value electric signal fed to an input terminal 100 into an optical FSK signal 10 having a wavelength of $\lambda_1 + \Delta\lambda$ or $\lambda_1 - \Delta\lambda$ according to the "1" or "0" level of the electric signal. Similarly, E/O converters 111 and 112 convert electric signals fed to input terminals 101 and 102 into optical FSK signals 11 and 12 ($\lambda_2 \pm \Delta\lambda$, $\lambda_3 \pm \Delta\lambda$) according to the "1" or "0" level of the corresponding electric signals. A combiner 120 multiplexes the optical FSK signals 10 to 12 and generates an optical FSK-WDM signal. A splitter 130 splits the optical FSK-WDM signal and bring the split signals to incidence on tunable wavelength filters 140 to 142. Each of the tunable wavelength filters 140 to 142 selects, out of the optical FSK-WDM signal, one of optical signals corresponding to the "1" and "0" levels of any optical FSK signal. By this selection, the optical FSK signals are converted into optical intensity-modulated signals or optical ASK signals 20 to 22. These optical ASK signals 20 to 22 are brought to incidence on FSK wavelength converters 150 to 152, which convert the optical ASK signals 20 to 22 into optical FSK signals 30 to 32 whose center wavelengths are $\lambda_1$ to $\lambda_3$, respectively, and send the converted signals to a combiner 121. The combiner 121 multiplexes the optical FSK signals 30 to 32, and the resultant optical FSK-WDM signal is split by a splitter 131 to supply the split signals to fixed wavelength filters 160 to 162. Each of the fixed wavelength filters 160 to 162 selects in a fixed manner, out of the optical FSK-WDM signal from the splitter 131, one of optical signals corresponding to the "1" and "0" levels of one of the optical FSK signals 30 to 32, whose center wavelength is $\lambda_1$, $\lambda_2$ or $\lambda_3$, and converts the optical FSK signal into an optical ASK signal. O/E converters 170 to 172, after converting the optical ASK signals into electric signals, supply the converted electric signals to output terminals 180 to 182, respectively. By setting each of the selection wavelengths of the tunable wavelength filters 140 to 142 to a wavelength corresponding to the "1" level or the "0" level of any optical FSK signal, channels can be established between the input terminals 100 to 102 and the output terminals 180 to 182. Further, since this optical WD switching system of the first preferred embodiment uses optical FSK signals, the influence of the crosstalk in the tunable wavelength filters 140 to 142 or the fixed wavelength filters 160 to 162 can be reduced.

The crosstalk influence reduction will now be explained in further detail with reference to FIGS. 8 and 9.

The occurring probabilities of the "1" and "0" levels being supposed to be ½ each, if crosstalk is absent in intensity modulation, the intensity or level of the received signal will be either 0 or 1 as shown in FIG. 8. Meanwhile, if crosstalk invites a 10% mixing of channel 1's signal into channel 2, the received signal will take the values of 1 and 1.1 and of 0 and 0.1, because the occurring probabilities of both "1" and "0" levels are ½ each as stated above, resulting in a narrowed eye opening as illustrated. Then, if another 10% mixing of channel 3's signal into channel 2 occurs, the eye opening will be further narrowed and the optical signal on channel 2 will deteriorate.

By contrast in this preferred embodiment of the invention, as the tunable wavelength filters 140 to 142 select only the optical FSK signal corresponding to the "0" or "1" level, any mixing of channels 1' and 3's optical signals into channel 2 would occur with respect to only one of the "0" and "1" levels as shown in FIG. 9, so that the eye opening would not be narrowed at all and the influence of the crosstalk on the degradation of the eye opening could be reduced.

FIG. 4 illustrates a specific example of the FSK wavelength converters 150 to 152 in FIG. 3. In FIG. 4, an O/E converter 210 converts an optical ASK signal 200 of a wavelength $\lambda_i$ into an electric signal 220. An E/O converter 230, which varies the wavelength of an optical signal in accordance with the input electric signal, converts the electric signal 220 into an optical FSK signal 240 having a center wavelength $\lambda_j$.

FIG. 5A shows another specific example of the FSK wavelength converters 150 to 152 in FIG. 3. Lights of wavelengths $\lambda_{j0}$ and $\lambda_{j1}$ are emitted from semiconductor laser elements 300 and 301, respectively, and sent out to a facet 321 of a tunable wavelength filter 320. Through the other facet 322 of the tunable wavelength filter 320 comes incident an optical ASK signal 330 of a wavelength $\lambda_i$. The internal refractive index of the tunable wavelength filter 320 varies with the intensity of the incident light, and its transmission wavelength varies along with that. For further details on the transition of the transmission wavelength of the tunable wavelength filter with the intensity of the incident light, reference may be made to Katsuaki Magari et al., "Optical Narrow-Band Filters Using Optical Amplification with Distributed Feedback", IEEE Journal of Quantum Electronics, Vol. 34, No. 11, November 1988.

Now it is supposed that, in the configuration of FIG. 5A, the transmission wavelength of the tunable wavelength filter 320 is so set as to be $\lambda_{j0}$ when a "0" level optical ASK signal 330 of a wavelength $\lambda_i$ comes incident and to be $\lambda_{j1}$ when a "1" level optical ASK signal 330 of a wavelength $\lambda_i$ comes incident. In this state, if the "0" level ASK signal 330 comes incident on the filter 320, the filter 320 will transmit the light of the wavelength $\lambda_{j0}$ from the semiconductor laser element 300. Meanwhile, if the "1" level ASK signal 330 comes incident on the filter 320, it will transmit the light of the wavelength $\lambda_{j1}$ from the semiconductor laser element 301. Thus there is obtained an optical FSK signal 340 to whose wavelengths $\lambda_{j0}$ or $\lambda_{j1}$ the "0" or "1" level optical ASK signal 330 corresponds, and the ASK signal 330 therefore can be converted into the FSK signal without having to be converted into an electric signal.

It also is possible to vary the wavelength of the light generated by the semiconductor laser element according to the luminous energy of the light. In this case, as illustrated in FIG. 5B, an optical ASK signal 350 of a wavelength $\lambda_i$ can be converted into an optical FSK signal 370 of a center wavelength $\lambda_j$, having two wavelengths corresponding to the "0" and "1" levels of the ASK signal 350, by directly injecting the ASK signal 350 of the wavelength $\lambda_i$ into the semiconductor laser element 360 oscillating at a wavelength of $\lambda_j$.

Figure 6:
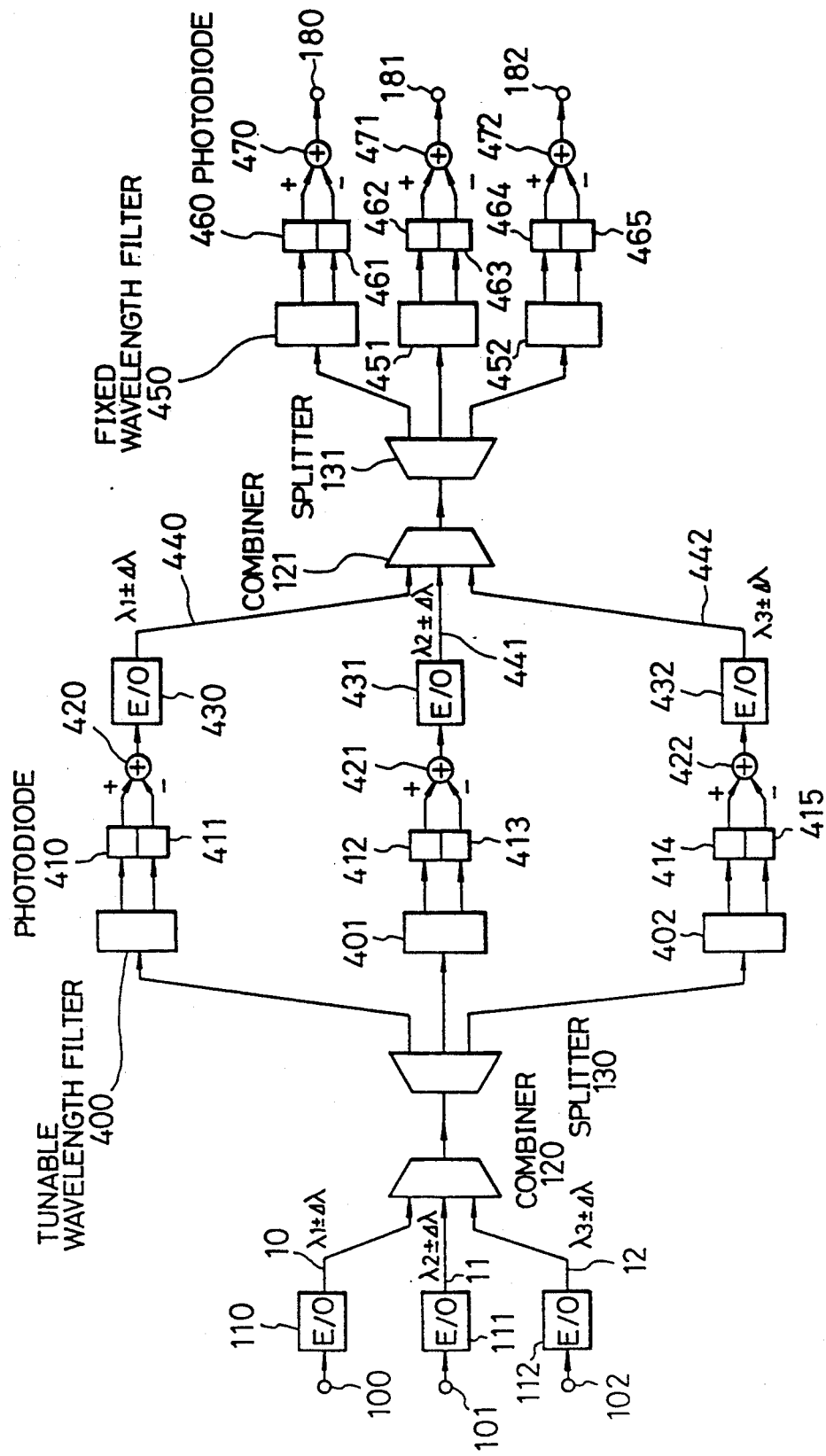
FIG. 6 is a block diagram illustrating another preferred embodiment of the invention.

FIG. 6 is a block diagram illustrating an optical WD switching system, which is another preferred embodiment of the present invention and in which three wavelengths are multiplexed as in the first embodiment shown in FIG. 3. Referring to FIG. 6, E/O converters 110 to 112 generate optical FSK signals 10 to 12 in center wavelengths $\lambda_1$, $\lambda_2$ and $\lambda_3$ according to the "0" or "1" level of electric signals supplied to input terminals 100 to 102, respectively. A combiner 120 multiplexes the FSK signals 10 to 12 to generate an optical FSK-WDM signal, which is split by a splitter 130 and supplied to tunable wavelength filters 400 to 402. The tunable wavelength filters 400 to 402 separately select, out of the optical FSK-WDM signals respectively, wavelengths corresponding to the "1" level and to the "0" level of any optical FSK signals, and send out the lights of these wavelengths to photodiodes 410 to 415. The photodiodes 410, 412 and 414 convert lights of the wavelengths corresponding to the "1" level, and the photodiodes 411, 413 and 415 convert lights of the wavelengths corresponding to the "0" level, of the optical FSK signals, into electric signals. Adders 420, 421 and 422 calculate the differences between the electrical signals from the photodiodes 410 and 411, between those from the photodiodes 412 and 413, and between those from the photodiodes 414 and 415, respectively.

E/O converters 430 to 432 convert the output electric signals of the adders 420 to 422 into optical FSK signals ($\lambda_1 \pm \Delta\lambda$, $\lambda_2 \pm \Delta\lambda$, $\lambda_3 \pm \Delta\lambda$) in the center wavelengths $\lambda_1$, $\lambda_2$ and $\lambda_3$ according to the "0" or "1" level of the electric signals. A combiner 121 multiplexes the FSK signals 440 to 442 to generate an optical FSK-WDM signal.

A splitter 131 splits the optical FSK-WDM signal and supplies the resultant split optical FSK-WDM signals to fixed wavelength filters 450 to 452. The fixed wavelength filter 450 selects in a fixed manner, out of the optical FSK-WDM signals 440 to 442, a wavelength $\lambda_1 + \Delta\lambda$ corresponding to the "1" level and a wavelength $\lambda_1 - \Delta\lambda$ corresponding to the "0" level, and sends them out to photodiodes 460 and 461. Similarly the fixed wavelength filters 451 and 452 select, out of the optical FSK-WDM signals, wavelengths $\lambda_2 \pm \Delta\lambda$ and $\lambda_3 \pm \Delta\lambda$, respectively, and supply them to photodiodes 462 to 465.

The photodiodes 460, 462 and 464 convert lights of the wavelengths ($\lambda_1 + \Delta\lambda$, $\lambda_2 + \Delta\lambda$, $\lambda_3 + \Delta\lambda$) corresponding to the "1" level, and the photodiodes 461, 463 and 465 convert lights of the wavelengths ($\lambda_1 - \Delta\lambda$, $\lambda_2 - \Delta\lambda$, $\lambda_3 - \Delta\lambda$) corresponding to the "0" level, of FSK signals into electric signals. An adder 470 calculates the difference between the electric signals from the photodiodes 460 and 461 and sends it out to an output terminal 180. Similarly, adders 471 and 472 respectively calculate the difference between the electric signals from the photodiodes 462 and 463 and that between the electric signals from the photodiodes 464 and 465, and send them out to output terminals 181 and 182.

Figure 7:
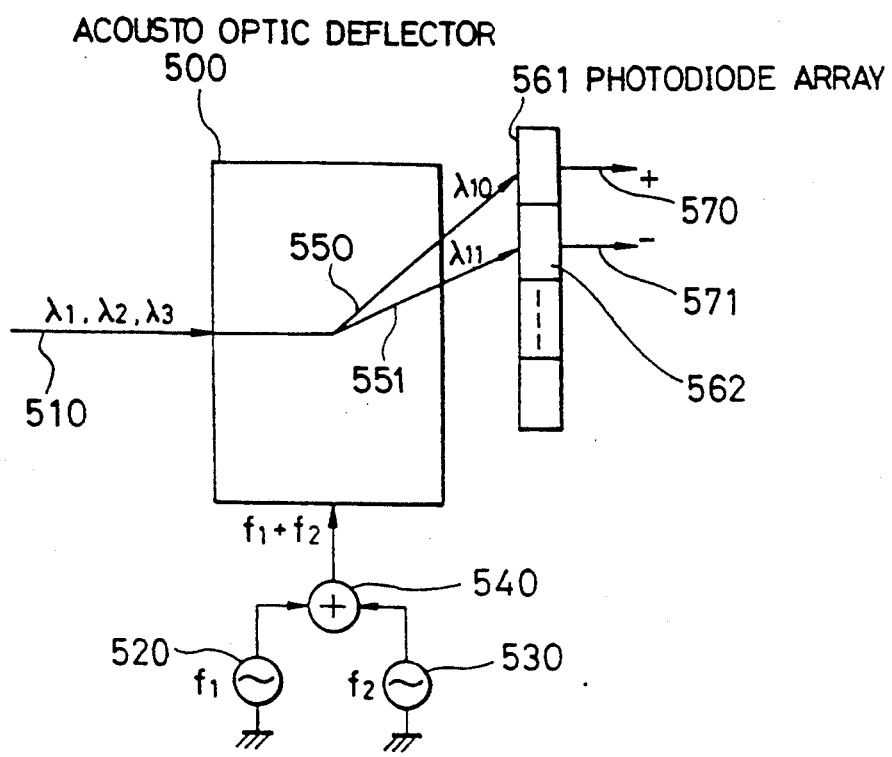
FIG. 7 is a block diagram illustrating examples of tunable and fixed wavelength filters for use in the embodiment of FIG. 6.

FIG. 7 illustrates examples of the tunable wavelength filters 400 to 402, photodiode array 410 to 412, fixed wavelength filters 450 to 452 and photodiode array 460 to 462 in the embodiment of FIG. 6. When an acousto-optical deflector 500 is driven by the addition signal which an adder produces by adding electric signals having frequencies of $f_1$ and $f_2$ from oscillators 520 and 530, the deflector 500 deflects, out of an optical WDM signal consisting of FSK signals of $\lambda_1$ to $\lambda_3$ in center wavelength, an optical signal of $\lambda_{10}$ ($\lambda_1 - \Delta\lambda$) in wavelength, which corresponds to the "0" level of the FSK signal of $\lambda_1$ in center wavelength. The deflected optical signal of the wavelength $\lambda_{10}$ is supplied to a photodiode 561 of a photodiode array 560. An optical signal of a wavelength $\lambda_{11}$ ($\lambda_1 + \Delta\lambda$) corresponding to the "1" level of the FSK signal of the center wavelength $\lambda_1$ is deflected toward a photodiode 562. The optical signals 550 and 551 are converted by the photodiodes 561 and 562 into electric signals 570 and 571, respectively. Accordingly, by appropriately controlling the oscillating frequencies of the oscillators 520 and 521, any two optical signals having different wavelengths can be converted into electric signals.

As hitherto described, the same benefit as the embodiment illustrated in FIG. 3 can be obtained by selecting with the tunable wavelength filters 400 to 402 of FIG. 6 wavelengths corresponding to the "1" and "0" levels of any FSK signal, and channels can be established between the input terminals 100 to 102 and the output terminals 180 to 182, respectively. Further, in this optical WD optical switching system of the second embodiment, since the signal content is twice as large as that in the first embodiment wherein tunable or fixed wavelength filters select wavelengths corresponding to either the "0" or "1" level of optical FSK signals, the ratio of the signal to the noise (S/N ratio) after the conversion of optical ASK signals into electric signals is therefore doubled, too.

As explained so far, the optical WD switching system, which uses optical FSK signals, can reduce the influence of crosstalk compared with such systems by the prior art.

What is claimed is:

1. An optical switching system comprising:

input means for receiving an optical wavelength-division multiplexed (WDM) signal in which optical frequency-shift keying (FSK) signals $F_i$ (i=1 to N) differing in center wavelength $\lambda_i$ are wavelength-division multiplexed;

wavelength extracting means for extracting said optical FSK signals $F_i$ (i=1 to N) from said optical wavelength-division multiplexed (WDM) signal and for generating optical amplitude-shift keying (ASK) signals $A_i$ pertaining to said wavelengths $\lambda_i$ which are to be switched to center wavelengths $\lambda_j$ (j=1 to N);

wavelength switching means for switching said optical ASK signals $A_i$ to optical FSK signals $F'_j$ (j=1 to N) differing in said center wavelengths $\lambda_j$; and means for wavelength-multiplexing said optical FSK signals $F'_j$ into an optical switched WDM signal.

2. An optical switching system according to claim 1, wherein said wavelength switching means includes both an optical-to-electrical converter and an electrical-to-optical converter.

3. An optical switching system according to claim 1, wherein said wavelength switching means includes two semiconductor lasers of different frequencies.

4. An optical switching system according to claim 3, wherein said different frequencies correspond to logic-level representations of said optical FSK signals $F'_j$.

5. An optical switching system according to claim 1, wherein said wavelength switching means is composed of a single semiconductor laser.

6. An optical switching system according to claim 1, wherein each of said optical ASK signals $A_i$ comprises a first optical ASK signal component $A^0_i$ corresponding to a logic level zero and a second optical ASK signal component $A^1_i$ corresponding to a logic level one, and wherein said wavelength switching means includes:

(a) photodiode means for converting said first and second optical ASK signal components $A^0_i$ and $A^1_i$ into first and second electric signals;

(b) subtracting means for producing a difference signal between said first and second electric signals; and (c) converting means for converting said difference signal into said optical FSK signals $F'_j$.

7. An optical switching system according to claim 6, wherein said wavelength extracting means includes an acousto-optical deflector.

* * * * *

UNITED STATES PATENT AND TRADEMARK OFFICE
CERTIFICATE OF CORRECTION

PATENT NO. : 5,170,273
DATED : December 8, 1992
INVENTOR(S) : Makoto Nishio It is certified that error appears in the above-identified patent and that said Letters Patent is hereby corrected as shown below:

Col. 1, ine 61, delete "Fi" and insert --$F_i$--.

Signed and Sealed this

Seventh Day of December, 1993

*Attest:*

BRUCE LEHMAN

*Attesting Officer*     *Commissioner of Patents and Trademarks*